United States Patent
Herrmann (10) Patent No.: US 7,707,585 B2
(45) Date of Patent: Apr. 27, 2010

(54) METHOD, SYSTEM, AND PROGRAM PRODUCT FOR MONITORING MESSAGE FLOW IN A MESSAGE QUEUING SYSTEM

(75) Inventor: Christian Herrmann, Rangendingen (DE)

(73) Assignee: International Business Machines Corporation, Armonk, NY (US)

( * ) Notice: Subject to any disclaimer, the term of this patent is extended or adjusted under 35 U.S.C. 154(b) by 1225 days.

(21) Appl. No.: 11/254,007

(22) Filed: Oct. 19, 2005

(65) Prior Publication Data

US 2006/0101148 A1 May 11, 2006

(30) Foreign Application Priority Data

Nov. 5, 2004 (EP) ................... 04105537

(51) Int. Cl.
*G06F 9/46* (2006.01)
*G06F 15/16* (2006.01)
(52) U.S. Cl. ...................... 719/314; 709/218
(58) Field of Classification Search ........... 719/314; 709/218
See application file for complete search history.

(56) References Cited

U.S. PATENT DOCUMENTS

| | | | | |
|---|---|---|---|---|
| 5,664,190 A | * | 9/1997 | Cohen et al. | 718/100 |
| 6,070,198 A | * | 5/2000 | Krause et al. | 719/321 |
| 6,253,225 B1 | * | 6/2001 | Nakahara et al. | 718/100 |
| 6,453,356 B1 | * | 9/2002 | Sheard et al. | 709/231 |
| 6,529,932 B1 | * | 3/2003 | Dadiomov et al. | 718/101 |
| 7,127,507 B1 | * | 10/2006 | Clark et al. | 709/224 |
| 2005/0240625 A1 | * | 10/2005 | Chang et al. | 707/104.1 |

* cited by examiner

*Primary Examiner*—Andy Ho
*Assistant Examiner*—Phuong N Hoang
(74) *Attorney, Agent, or Firm*—Jordan Law LLC (57) ABSTRACT

System, method, and computer program product for automatically monitoring message flow in a message queuing system in an asynchronous messaging network. A message queuing application programming interface appends, in a message descriptor field for recording and monitoring message flow, unique application identification keys of applications that process the message, operation codes applied to the message, and time stamps of operations applied during message processing. The keys are generated by the start-up of the applications and are filled in by each PUT and GET function of the API. After processing of the message, the entries included in the message descriptor field are monitored, and any deviation from a predefined message flow is automatically detected and reported.

16 Claims, 7 Drawing Sheets

METHOD, SYSTEM, AND PROGRAM PRODUCT FOR MONITORING MESSAGE FLOW IN A MESSAGE QUEUING SYSTEM

BACKGROUND

The present invention relates to message queuing in an asynchronous messaging network, and in particular to a method, system, and computer program product for monitoring message flow in a message queuing system.

It is increasingly common to distribute a data processing operation over a plurality of data processing units, with each of the units communicating over a data communications network such as the Internet. One reason for this is that a particular data processing unit may be able to do a job better than another, so a first unit makes a request for a second unit to do a particular job and then to return the result to the first unit.

It is also very common to have a large number of intermediate data processing units (also known as "nodes") between the originating unit that makes a request and the destination unit that is being requested to do the work. Each intermediate unit receives the request, performs some initial processing to determine what to do with it, and then forwards it on to the next unit.

A popular mechanism for carrying out such distributed data processing is called asynchronous message queuing, wherein applications communicate with each other by sending messages to queues, which can then be accessed by the receiving application at a convenient time. IBM's WebSphere MQ (trademark) software product is an example of this type of software. More and more companies are providing services based on message queuing systems as underlying information transportation infrastructure.

A problem in such message queuing systems is to monitor message flow, especially to identify all of the applications involved in processing messages as well as their sequence of involvement. This problem becomes more important when using message queuing systems in a grid architecture, or whenever it is essential to ensure that a message has been processed in a predefined sequence by the authorized applications.

Figure 1A:
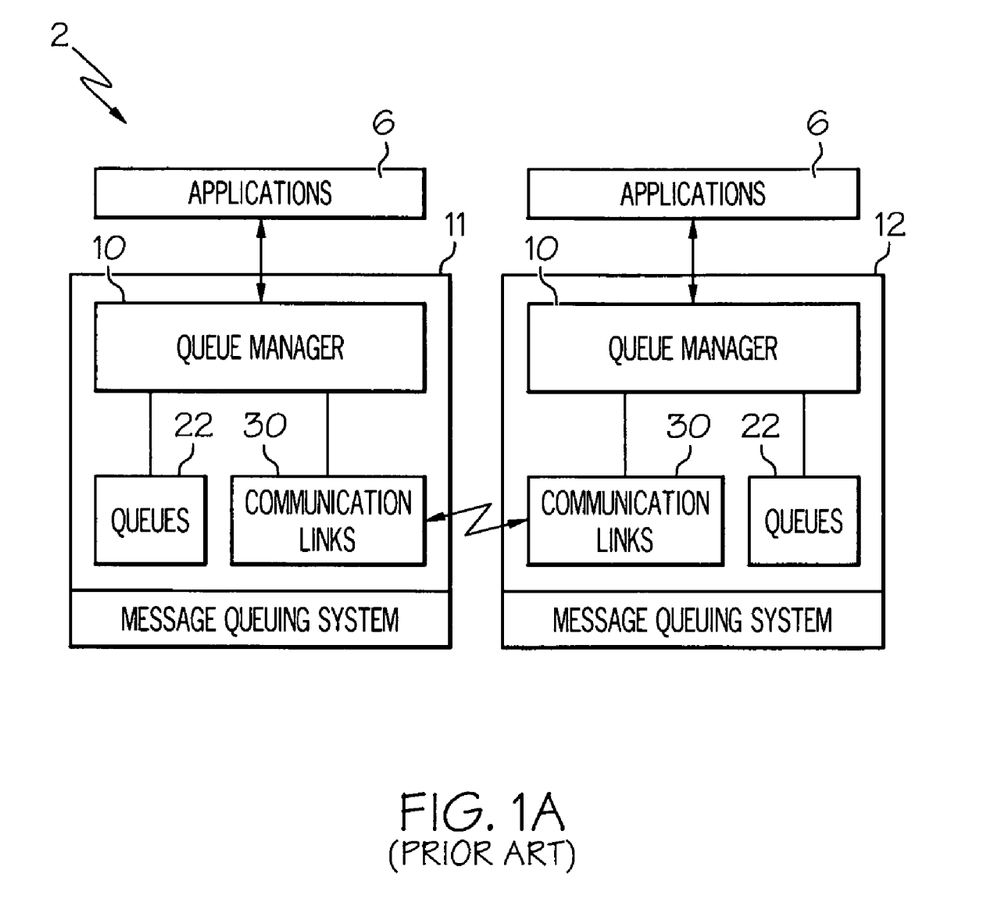
FIG. 1A shows a prior art message queuing system.
Figure 1B:
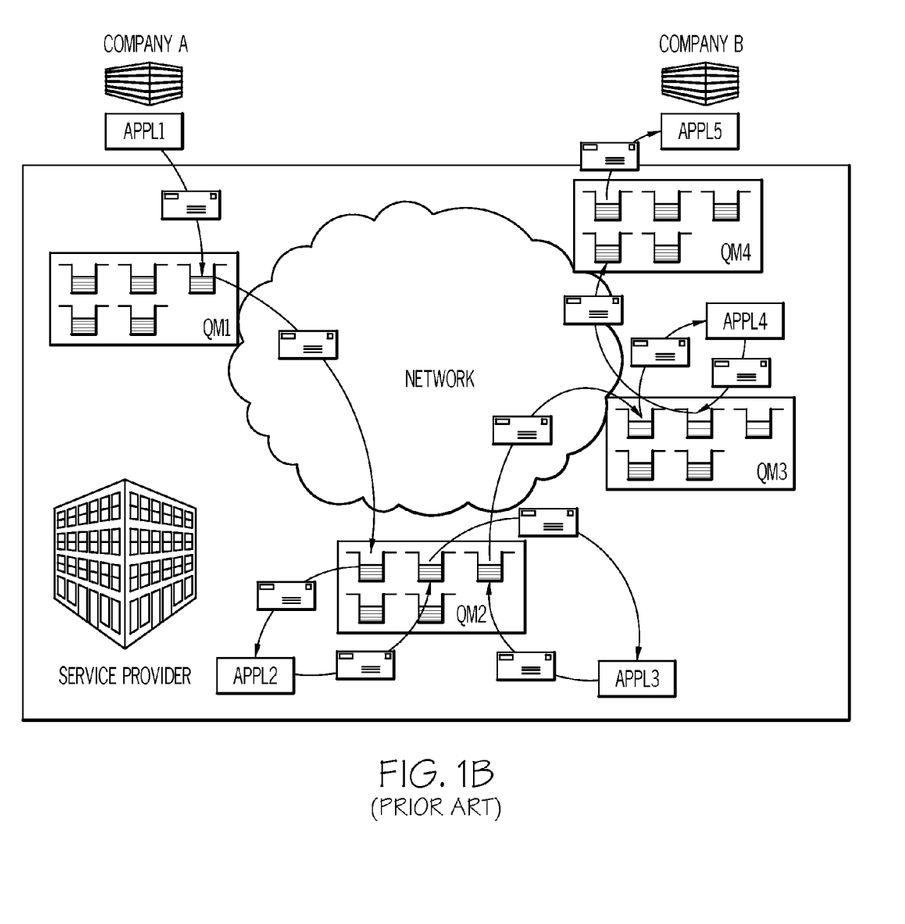
FIG. 1B shows a message flow in an asynchronous messaging network.

An example would be, as shown in FIG. 1 B, a service provider which provides business-to-business (B2B) services for other companies. A company A (Appl1) sends messages to the Service Provider which will be processed and then sent to the other company B (Appl5). However, there is no evident way for the two companies to ensure that the agreed applications have been used in the agreed sequence (Appl1, Appl2, Appl3, Appl4, Appl5) and that no other application has used or read their messages.

SUMMARY

The present invention provides a system, method, and computer program product for automatically monitoring message flow in a message queuing system in an asynchronous messaging network. A message queuing application programming interface (API) appends, in a message descriptor field for recording and monitoring message flow, unique application identification keys (ApplIdentKeys) of applications involved in processing the message, operation codes of operations applied to the message, and time stamps of operations applied during processing of the message. The ApplIdentKeys are automatically generated by the start-up of the applications and filled in by each PUT and GET function of the message queuing API. After processing of the message, the content of the entries included in the message descriptor field is monitored, and any deviation from a predefined message flow is automatically detected and reported.

According to an embodiment, a computer program product including a computer readable storage medium has computer readable program code tangibly embodied therein. The computer readable program code may be configured to compute application identification keys during startup of applications, connect the applications to a message queuing system and execute GET message operations for retrieving messages from a queue of the message queuing system initiated by a request from a requesting application. The computer readable program code may also be configured to store content of message descriptor fields of retrieved messages, and update message descriptor fields by appending application identification keys of requesting applications, and operation codes and sequences of the GET operations to message descriptor fields of retrieved messages. The computer readable program code may also be configured to pass messages with the updated message descriptor fields to requesting applications, and process messages by the requesting applications.

BRIEF DESCRIPTION OF THE SEVERAL VIEWS OF THE DRAWINGS

The invention will be best understood by reference to the following detailed description of an illustrative embodiment when read in conjunction with the accompanying drawings, wherein.

DETAILED DESCRIPTION

FIG. 1A shows message queuing systems 11, 12 within a messaging network 2. An application 6 generates messages and sends them to one of the message queuing systems 11, 12. Each of the message queuing systems 11, 12 may include a queue manager 10, Queues 22, and communication links 30 to other message queuing systems. A queue 22 is a data structure used to store messages until they are retrieved by an application. Queues 22 are managed by a queue manager 10. The queue manager 10 is responsible for maintaining the queues 22 it owns, and for storing all the messages it receives from application programs or other queue managers onto the appropriate queues, and retrieving the messages in response to application requests.

Queues 22 Exist independently of the applications that use them. A queue can exist in the main storage if it is temporary, on disk or similar auxiliary storage if it must be kept in case of recovery, or in both places if it is currently being used and must also be kept for recovery.

A message queuing system is a system for asynchronous, assured exchange of information in the form of messages between applications connected to the system. The message descriptor of the message is known and interpretable by the message queuing system, but not the message body whose layout is variable and application dependent. A message queuing system stores and transports messages regardless and without knowledge of the content in the message body.

Multiple message queuing systems can be interconnected in a message queuing network 2 which allows applications on different platforms and different physical locations to easily exchange data without knowledge of the underlying infrastructure.

Figure 1C:
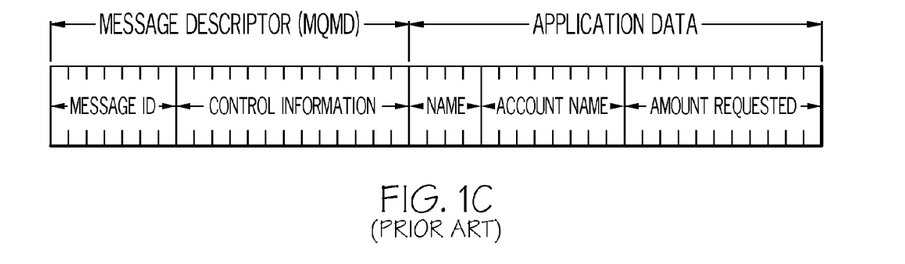
FIG. 1C shows the structure of a message used by the prior art message queuing system.

FIG. 1C shows the structure of a prior art message. Every message consists of a message descriptor and a message body. The message descriptor identifies the message (message ID) and contains additional control information such as the type of the message and the priority assigned to the message by the sending application. The message body includes the application data. The content and structure of the application data is defined by the application program that uses them.

Figure 2A:
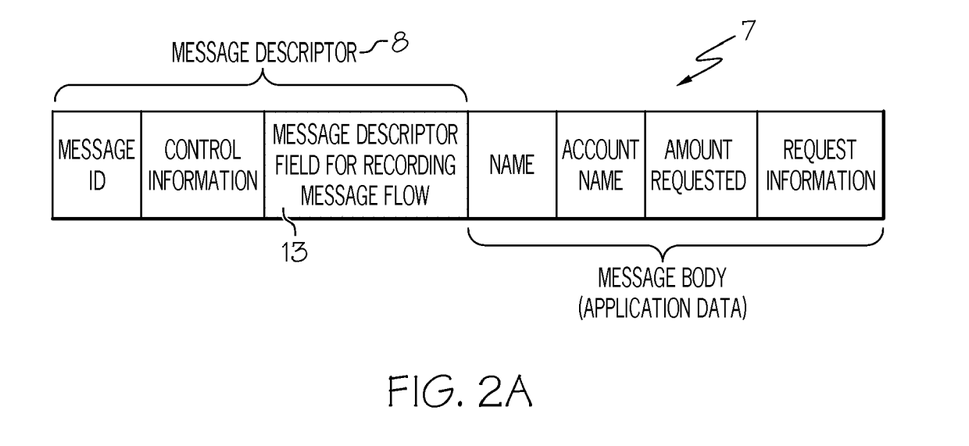
FIG. 2A shows the structure of a message according to the present invention.

FIG. 2A shows the new structure of a message 7 that is generated according to the present invention. Compared with the prior art message structure, the message descriptor 8 is extended by field 13 for recording message flow of message in a message queuing system (hereinafter called message descriptor field). The message descriptor field 13 contains Application Identification Keys (hereinafter called ApplIdentKey) of each application getting the message from a queue or putting the message into a queue, an operation code identifying the operation applied to the message, and a time stamp of operation of the message.

The message descriptor field 13 cannot be modified by the application code because the message queuing API is the interface to the messaging queuing system. The ApplIdentKey is also passed to the queue manager with each PUT or GET request. On a roll-back of a GET operation (in case of a roll-back requested by the application or in case of an abend of the application) the queue manager appends the ApplIdentKey received with the request to the message descriptor field 13 with the appropriate operation code and the time stamp of the operation.

Figure 2B:
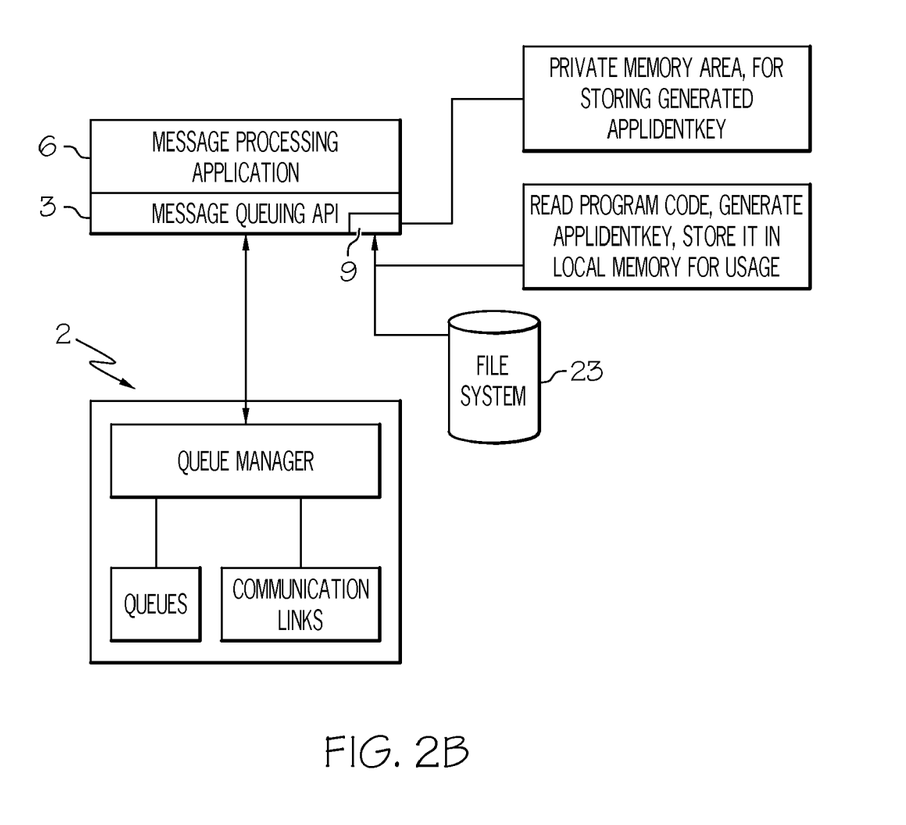
FIG. 2B shows a prior art message queuing system according to FIG. 1A extended by the inventive message queuing API for generating the inventive structure of the message as shown in FIG. 2A.

FIG. 2B shows the prior art message queuing system 2As shown in FIG. 1A extended by the inventive message queuing API 3 for generating input in the inventive structure of the message as shown in FIG. 2A.

During initialization (start up of the application) the ApplIdentKey may be computed by using the program code of the message processing application 6 from the file system 2As input and applying a hash function to that input. The ApplIdentKey is preferably stored in the private memory (9; volatile memory) of the message queuing API 3 and inserted by the message queuing API 3 into message descriptor field of the messages on each PUT and GET operation of each message.

On each message GET or PUT operation, the ApplIdentKey of the application is appended in the message descriptor field including the type of operation and time stamp of operation. Four types of operations are defined and used for the recording. These operations are:
PUT: a message has been put on the queue,
GETC: a message has been successfully taken from the queue,
GETR: a message has been taken from the queue but the operation has been rolled back (identifies problems or intruders who only want to read messages), and
GETB: a message has been read (in contrast to GETR this could be a valid processing step).

Figure 2C:
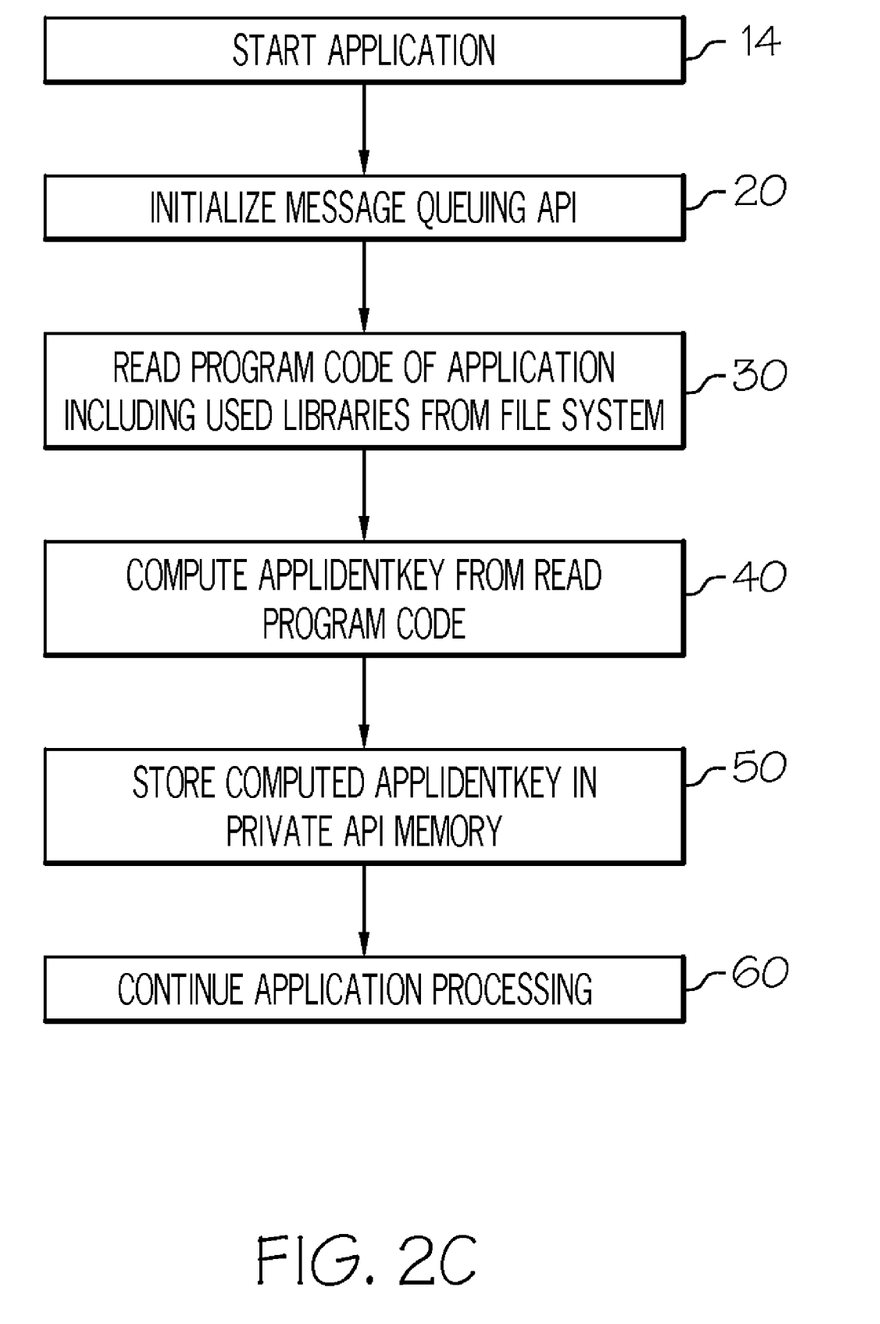
FIG. 2C shows a method for generating the ApplIdent-Keys.

FIG. 2C shows the inventive method for computing the ApplIdentKey according to FIG. 2B. During the start up of a message queuing application the ApplIdentKey is computed by the initialization functions of the message queuing API as shown in FIG. 2C (14, 20, 30). The ApplIdentKey is computed by using the application code from the file system including all used dynamic linked libraries as input applying a hash function to that input 40. The ApplIdentKey is preferably stored in the private memory of the message queuing API 50. The application then connects to a message queuing system and retrieves a message from a queue (100; see FIG. 2D).

Figure 2D:
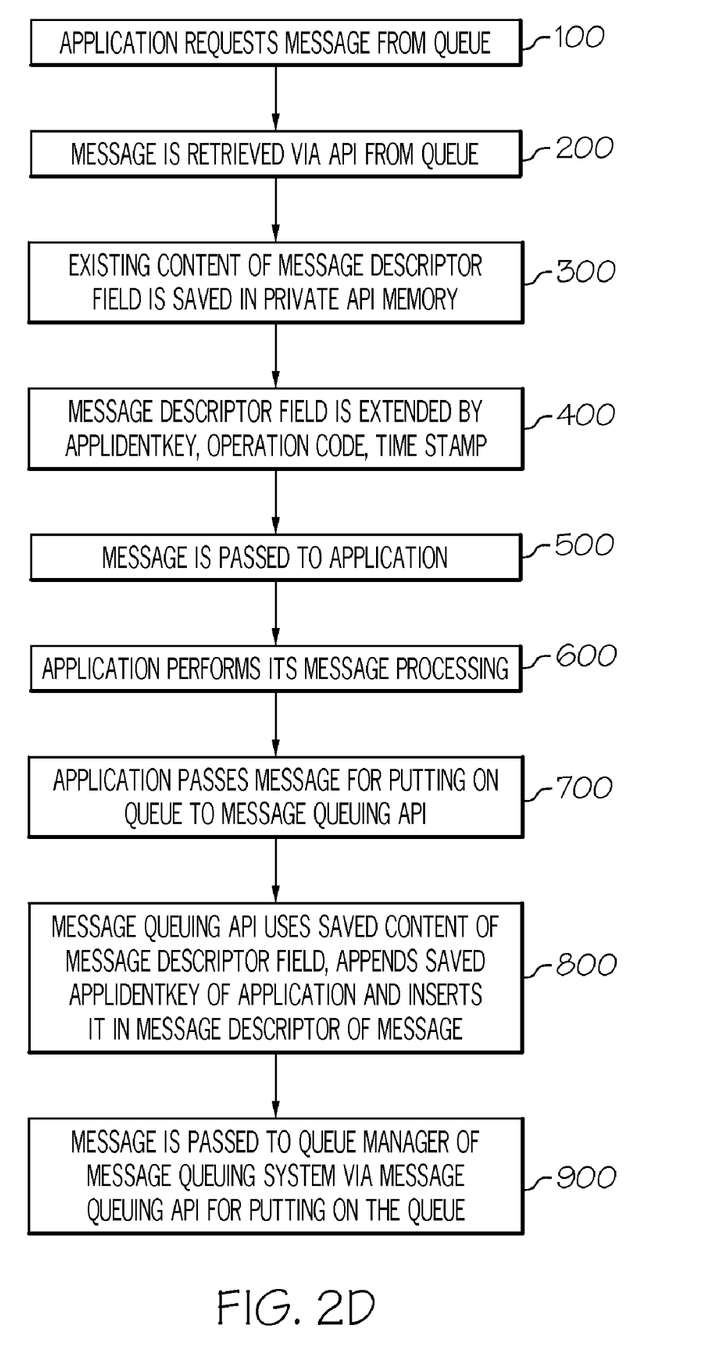
FIG. 2D shows a method for generating list of entries (content) in the message descriptor field during processing of the message.

The content of the message descriptor field of the retrieved message is safely stored in a private memory area of the message queuing API (300) and is extended by the ApplIdentKey of the application processing the message, GET C operation code, and current time stamp (400). The updated message field content is then passed by the message queuing API to the Application (500), and the application processes the message (600). Finally, the application passes the updated message for putting on another queue to the message queuing API (700).

The message queuing API uses the previously safely stored message descriptor field, and appends the ApplIdentKey computed during start up including the PUT operation code and time stamp in the message descriptor field of the message (800). The message is then passed to the queue manager of the message queuing system which puts it on the desired queue (900).

Figure 2E:
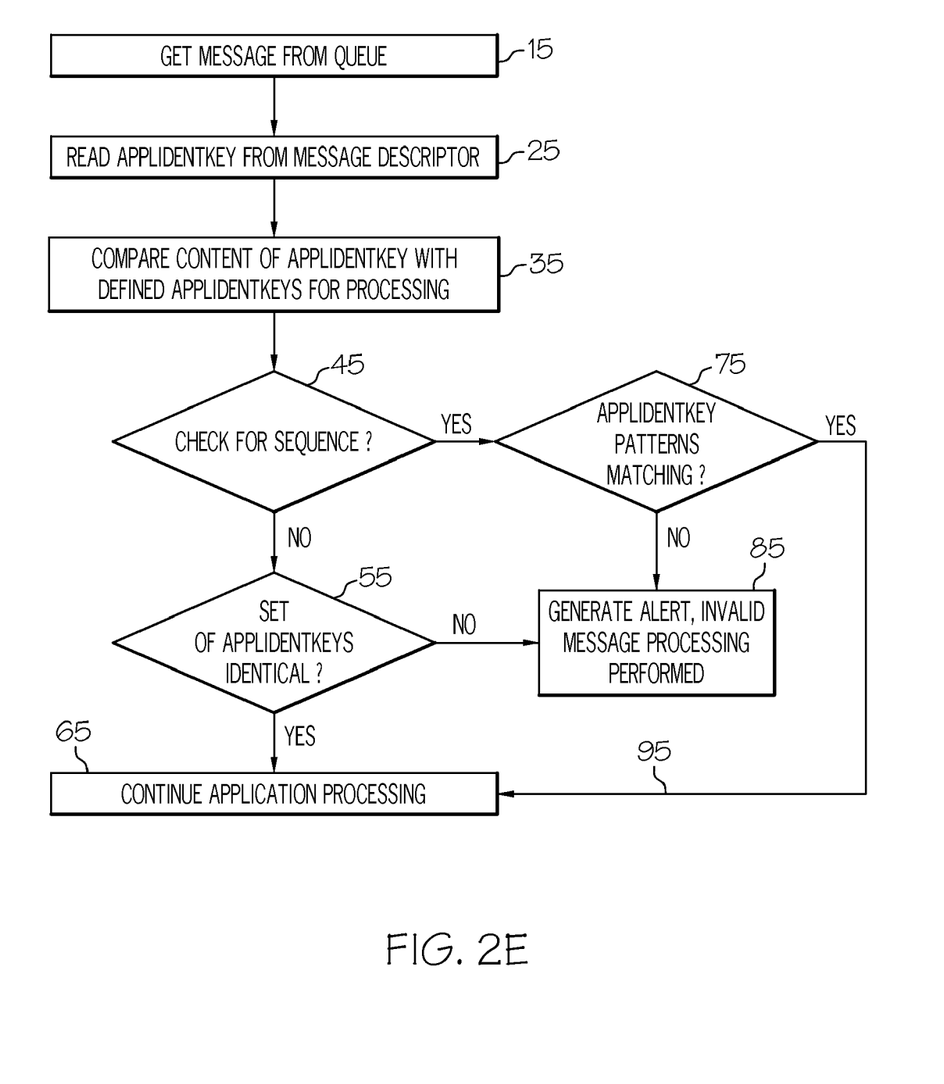
FIG. 2E shows a method for monitoring the message flow based on the list of entries (content) included in the message descriptor field.

FIG. 2E shows the inventive method for monitoring the message flow by using the content in the message descriptor field. The application is retrieving a message via the message queuing API 15. The message queuing API appends the ApplIdentKey of the application including the GETC operation code and the current time stamp and then safely stores the content of the message descriptor field in its private memory before passing the message to the application 25. If the application wants to check whether the message has been processed by the defined applications in the defined sequence, it reads the content of the message descriptor field and compares it with a predefined list of ApplIdentKeys. Thereby the operation codes can be also taken into account if needed 35. The sequence of the ApplIdentKeys must be identical 45, 75, otherwise the application raises an alert 85 and puts the message in doubt on another queue for further processing such in-doubt messages.

If the application needs to check only whether only authorized applications have accessed the message, it reads the content of the message descriptor field and checks whether the ApplIdentKeys are in the predefined list of authorized applications 55. If not, the application raises an alert 85 and puts the message in doubt on another queue for further processing. If the check is successful, the application continuous processing 65.

Figure 2F:
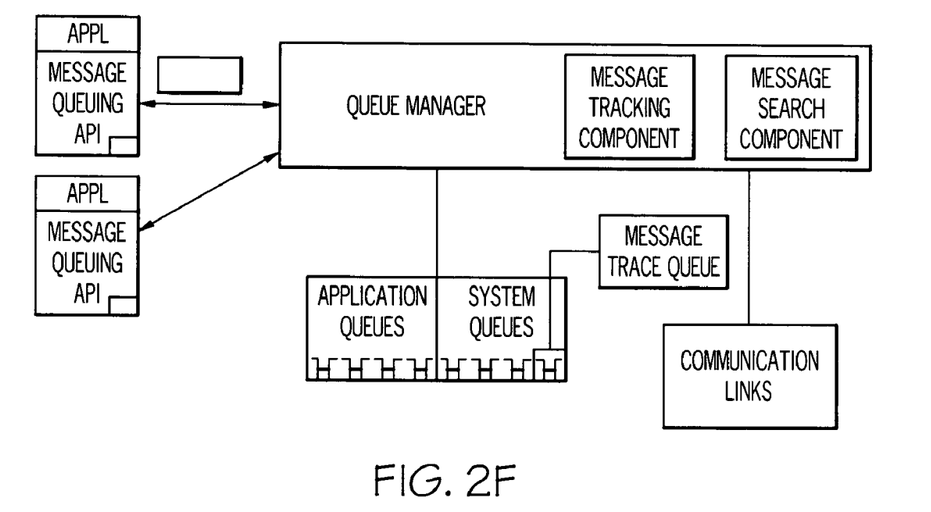
FIG. 2F shows an exemplary embodiment of a message queuing system in which the present invention may be preferably used.
Figure 2G:
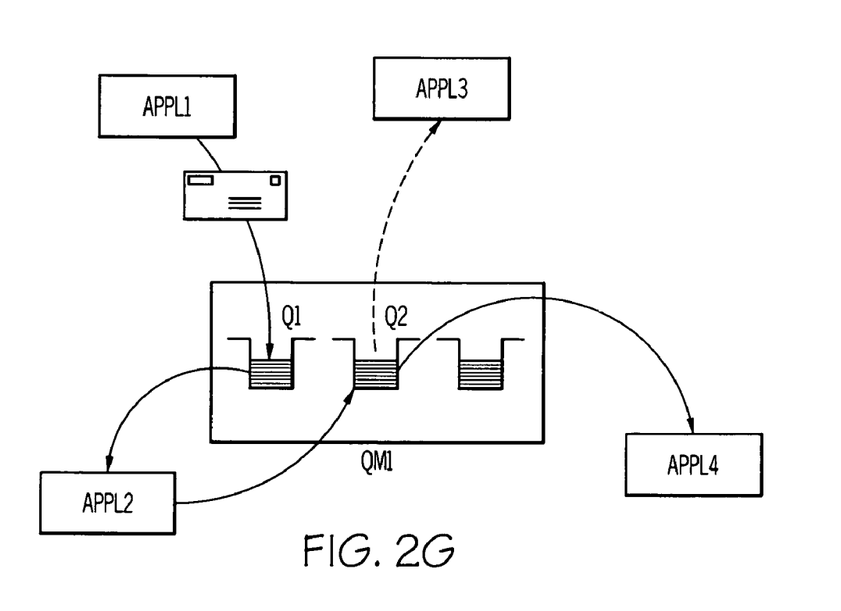
FIG. 2G shows a messaging queuing system scenario and examples of the message flow in that messaging queuing system scenario using the present invention.

Several examples of a message flow in a messaging queuing system scenario as shown in FIG. 2G with its content in the message descriptor field according to the present invention are described. The initial application Appl1 in FIG. 2G is connected to the queue manager of a message queuing system QM1. During start-up of the application, the initialization routine of the message queuing API linked to the application reads the application code including all used dynamic loadable libraries and generates the ApplIdentKey. The ApplIdentKey is appended to the message descriptor field for recording and monitoring message flow for every GET and PUT operation on a queue. Appl1 puts a message on queue Q1, and the message queuing API appends the ApplIdentKey, the operation code PUT, and the current time stamp to the message descriptor field.

Content of the message descriptor field (ApplIdentKey, operation code, time stamp)

| | | |
|---|---|---|
| DE407645D4BA715429362C2E0F1FF23DDAB72395 | PUT | TS1 |

Application Appl2Gets the message from Q1. As a part of the message GET-operation the message queuing API appends the ApplIdentKey of Appl2 to message descriptor field of Appl1. The operation code of this message get is GETC in case of a successful get.

Content of the message descriptor field

| | | |
|---|---|---|
| DE407645D4BA715429362C2E0F1FF23DDAB72395 | PUT | TS1 |
| CC35978824436FFE3C001BF352F996E74E4AC465C | GETC | TS2 |

Application Appl2Does its processing and puts the message on Q2. Again, the message queuing API appends the ApplIdentKey of Appl2 to the message descriptor field in conjunction with the operation code PUT.

Content of the message descriptor field

| | | |
|---|---|---|
| DE407645D4BA715429362C2E0F1FF23DDAB72395 | PUT | TS1 |
| CC35978824436FFE3C001BF352F996E74E4AC465C | GETC | TS2 |
| CC35978824436FFE3C001BF352F996E74E4AC465C | PUT | TS3 |

Now, assuming application Appl3 is trying to get messages from Q2, it gets the message, reads the content, and rolls back that operation. In this case, the message queuing API appends a fourth entry to the message descriptor field consisting of the ApplIdentKey of Appl3, the operation code GETR, and the time stamp of that operation.

Content of the message's descriptor field

| | | |
|---|---|---|
| DE407645D4BA715429362C2E0F1FF23DDAB72395 | PUT | TS1 |
| CC35978824436FFE3C001BF352F996E74E4AC465C | GETC | TS2 |
| CC35978824436FFE3C001BF352F996E74E4AC465C | PUT | TS3 |
| 78243CC3549FF56E389C008F996E74E4AC465CADF | GETR | TS4 |

Now application Appl4 gets the message successfully and checks whether this message is from Appl1And whether it has been processed successfully by Appl2 and no further application. In this case, Appl4 detects that Appl3 did a message GET and rolled back that operation. So Appl4 generates an intruder alert on the message so that an operator can decide what to do.

Another example of this scenario is a case wherein a second application should have processed the message after Appl2And before Appl4, but not Appl3. So again, Appl4 would generate an alert signaling a processing sequence error.

A further example would be a case wherein a message processing agreement of two business partners and a service provider is checked. The permissible message processing flows are agreed with the service provider. The service provider provides the ApplIdentKeys of the authorized applications to the business partners. Depending on the services the partners want to use from the service provider, the sending partner may add the intended processing flow to the message by adding a list of ApplIdentKeys of the encountered applications to the message. This list is then encrypted by the sender with the public key of the responder. If the responder receives the message from the service provider, he decrypts the list of ApplIdentKeys with its private key and compares it with the content of the message descriptor field. He or she is now able to detect whether the processing steps have been performed in the indented order by the agreed applications and whether other applications have tried to read the message.

FIG. 2F shows a specific embodiment of a message queuing system preferably used by the present invention. The message queuing system uses a content-based message tracking mechanism. The message descriptor of the messages contains a content key generated by the message generating application. The content key provides search information that is derived from the application data contained in the message body. The content key may be encrypted and authenticated as needed. Applications in the same business context are able to create appropriate search requests. This message system may be adapted to the present invention by extending the message descriptor by a message descriptor field for recording and monitoring message flow.

Furthermore, each message queuing system may contain a message trace component that administers a message trace queue and add entries in that message trace queue for each operation of a message. Each entry in the message trace queue contains at least the message id, content key, the time stamp of the entry, and source queue as far as the message is not transferred to another message queuing system. If the message is transferred to another queuing system the entry contains additionally the target queue and target queuing system. According to the present invention, the message trace queue may also contain the content of the message descriptor field.

Furthermore, each message queuing system may be extended by the inventive message queuing application programming interface generating the content of the message descriptor field as described in conjunction with FIG. 1C.

Finally, each message queuing system may contain a message search component which provides the functionality to search for the current location of the message as well as to retrieve the whole trace of the movement of specified a message in messaging network. This allows an auditor to check the processing flow of a specific message.

What is claimed is:

1. A message queuing system in a messaging network, wherein the messaging network includes a plurality of message queuing systems that communicate with each other via a communication link, wherein each message queuing system includes at least a queue manager for queuing received messages onto appropriate queues and retrieving messages in response to requests, and at least one queue for queuing messages, the message queuing system comprising:

a data processing unit to execute a message queuing API for computing application identification keys and appending the application identification keys in conjunction with types and sequences of operations applied to messages to message descriptor fields for recording and monitoring message flow in the messaging network;

the data processing unit to evaluate content of the message descriptor fields, wherein an application identification key is computed during start-up of an application by using program code of the application from a file system as input and applying a hash function to the input.

2. The system according to claim 1, wherein the message queuing API is dynamically linked at run-time.

3. The system according to claim 1, wherein the message queuing API is statically linked during build time.

4. The system according to claim 1, wherein application identification keys are stored in private memory of the message queuing API.

5. The system according to claim 1, wherein operations include GET, GETC, GETB, PUT.

6. The system according to claim 1, wherein sequence of operations is based on time stamps.

7. The system according to claim 1, wherein the monitoring means is part of the message queuing API.

8. The system according to claim 7, wherein the monitoring means compares content of a message descriptor field and automatically generates an alert if the content of the message descriptor field deviates from a predefined message flow.

9. The message queuing system of claim 1, wherein each message includes a message descriptor field and a message body.

10. A method comprising:
computing application identification keys during start-up of applications;
appending application identification keys in conjunction with types and sequences of operations applied to messages to message descriptor fields for recording and monitoring message flow in a messaging network; and
monitoring content of the message descriptor fields, wherein the computing, appending and monitoring are conducted by a data processing unit, wherein an application identification key is computed during start-un of an application by using program code of the application from a file system as input and applying a hash function to the input.

11. A method for monitoring message flow in a messaging network, wherein the messaging network includes a plurality of message queuing systems that communicate with each other via a communication link, wherein each message queuing system includes at least a queue manager for queuing received messages onto appropriate queues and retrieving messages in response to requests, and at least one queue for queuing messages, wherein the method comprises:
computing an application identification key during start-up of an application;
connecting the application to a message queuing system;
executing a GET message operation for retrieving a message from a queue of the message queuing system initiated by a request from a requesting application;
storing content of a message descriptor field of the retrieved message;
updating the message descriptor field by appending an application identification key of the requesting application, and an operation code and sequence of the GET operation to a message descriptor field of the retrieved message, to provide an updated message;
passing the updated message to the requesting application;
processing the message by the requesting application;
accessing a predefined message flow containing application identification keys of applications authorized to process the message and information about a sequence of involvement of applications;
comparing the predefined message flow with content of the message descriptor field; and
automatically generating an alert if the content deviates from the predefined message flow.

12. The method according to claim 11, further comprising:
executing a PUT operation on the updated message to another queue of a message queuing system;
appending an application identification key of an executing application including the PUT operation code, and sequence of operation of the PUT operation to the message descriptor field of the updated message to provide a newly updated message; and
passing the newly updated message to the queue manager of the message queuing system which puts the newly updated message on the desired queue.

13. The method according to claim 11, wherein the predefined message flow is provided to each message queuing system in an encrypted version.

14. The method according to claim 11, wherein the application identification key is computed by using program code of an application from the file system as input and applying a hash function to the input.

15. The method according to claim 11, wherein the sequence of operations is based on time stamps.

16. A computer program product comprising a computer readable storage medium having computer readable program code stored thereon to be executed by a processor, the computer readable program code comprising:
computer readable program code configured to compute application identification keys during start-up of applications;
computer readable program code configured to connect the applications to a message queuing system;
computer readable program code configured to execute GET message operations for retrieving messages from a queue of the message queuing system initiated by a request from a requesting application;
computer readable program code configured to store content of message descriptor fields of retrieved messages;
computer readable program code configured to update message descriptor fields by appending application identification keys of requesting applications, and operation codes and sequences of the GET operations to message descriptor fields of retrieved messages;
computer readable program code configured to pass messages with the updated message descriptor fields to requesting applications; and
computer readable program code configured to process messages by the requesting applications;
computer readable program code configured to access a predefined message flow containing application identification keys of applications authorized to process the message and information about a sequence of involvement of applications;
computer readable program code configured to compare the predefined message flow with content of the message descriptor field; and
computer readable program code configured to automatically generate an alert if the content deviates from the predefined message flow.

* * * * *